United States Patent
Herington et al.

(10) Patent No.: US 7,941,804 B1
(45) Date of Patent: May 10, 2011

(54) ALLOCATING RESOURCES AMONG TIERED PARTITIONS OF DIFFERENT TYPES

(75) Inventors: Daniel E. Herington, Dallas, TX (US); Clifford A. McCarthy, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1591 days.

(21) Appl. No.: 11/263,140

(22) Filed: Oct. 31, 2005

(51) Int. Cl.
*G06F 9/46* (2006.01)
*G06F 15/00* (2006.01)

(52) U.S. Cl. ............................ 718/104; 718/102; 712/13

(58) Field of Classification Search .................. 718/104, 718/102; 712/13, 228
See application file for complete search history.

(56) References Cited

U.S. PATENT DOCUMENTS

| | | | |
|---|---|---|---|
| 6,247,109 B1 * | 6/2001 | Kleinsorge et al. ............. | 712/13 |
| 6,345,287 B1 * | 2/2002 | Fong et al. .................... | 718/102 |
| 7,007,276 B1 * | 2/2006 | Kubala et al. ................. | 718/104 |
| 7,140,020 B2 * | 11/2006 | McCarthy et al. ............ | 718/104 |
| 7,143,413 B2 * | 11/2006 | McCarthy et al. ............ | 718/104 |
| 7,290,260 B2 * | 10/2007 | Miller ........................... | 718/104 |
| 2003/0037092 A1 * | 2/2003 | McCarthy et al. ............ | 709/104 |

OTHER PUBLICATIONS

U.S. Appl. No. 09/493,753, filed Jan. 28, 2000.

* cited by examiner

*Primary Examiner* — Meng-Ai An
*Assistant Examiner* — Tammy Lee

(57) ABSTRACT

In one embodiment, a system comprises a plurality of partitions that provide isolated operating environments for execution of software processes, wherein the plurality of partitions are arranged in a tiered manner with different partition types at different tiers, a data structure for representing the plurality of partitions, wherein the data structure comprises multiple nodes corresponding to the plurality of partitions and links between the nodes representing how the plurality of partitions are arranged in the tiers, and an arbiter software module for allocating resources between the plurality of partitions, wherein the arbiter software module receives requests to allocate resources to the plurality of partitions and traverses the data structure to determine which requests to satisfy.

24 Claims, 2 Drawing Sheets

US 7,941,804 B1

ALLOCATING RESOURCES AMONG TIERED PARTITIONS OF DIFFERENT TYPES

TECHNICAL FIELD

The present application is generally related to allocating resources in a computer system.

BACKGROUND

In computer systems, partitions are physical or logical mechanisms for isolating operational environments within single or multiple servers. Examples of partitions include "node partitions," "virtual partitions," and "resource partitions" that are implemented using various products available from Hewlett-Packard Company. Node partitions ("nPars") are hard partitions that provide electrical and software isolation. The partitions are implemented using various "cells" that have one or several processors. Various functionality is provided to limit the communication between the cells. Accordingly, any fault within a given nPar cannot impact any other nPar. Virtual partitions (vPars) provide application and operating system isolation. Specifically, each vPar runs its own image of the operating system and can fully host its own applications. Resource partitions may be run within nPars or vPars. Resource partitions are used to dynamically create partitions for applications that benefit from guaranteed dedicated resources, such as CPU resources, networking resources, and/or disk input/output resources. Resource partitions can be implemented using scheduling algorithms (such as fair share schedulers) that control access to the resources of interest.

In addition to providing isolation, partitions provide the ability to shift resources of a computer system from workloads that possess excess resources to workloads that would benefit from additional resources. For example, it is possible to transfer a processor from a given nPar to another nPar, a processor from a vPar to another vPar, or a processor from a resource partition to another resource partition. The interfaces and mechanisms (for nPars) used to perform such transfers depends upon the particular partitions involved.

SUMMARY

In one embodiment of the present invention, a computer system comprises a plurality of partitions that provide isolated operating environments for execution of software processes, wherein the plurality of partitions are arranged in a tiered manner with different partition types at different tiers, a data structure for representing the plurality of partitions, wherein the data structure comprises multiple nodes corresponding to the plurality of partitions and links between the nodes representing how the plurality of partitions are arranged in the tiers, and an arbiter software module for allocating resources between the plurality of partitions, wherein the arbiter software module receives requests to allocate resources to the plurality of partitions and traverses the data structure to determine which requests to satisfy.

DETAILED DESCRIPTION

Some representative embodiments of the present invention are directed to systems and methods for allocation of resources across arbitrary combinations of partition technologies. Specifically, known workload management software experiences a significant amount of difficulty when multiple types of partitions are employed. Known workload management software can only be employed with a selected number of predetermined partition combinations and can only perform limited resource transfers in response to workload demands. In contrast, some representative embodiments of the present invention use a tree data structure to represent any arbitrary arrangement of partitions. The tree data structure enables conflicting resource requests to be efficiently resolved. Also, the tree structure identifies the order in which deallocation and allocation operations should be performed when transferring resources from one partition to another partition.

Figure 1:
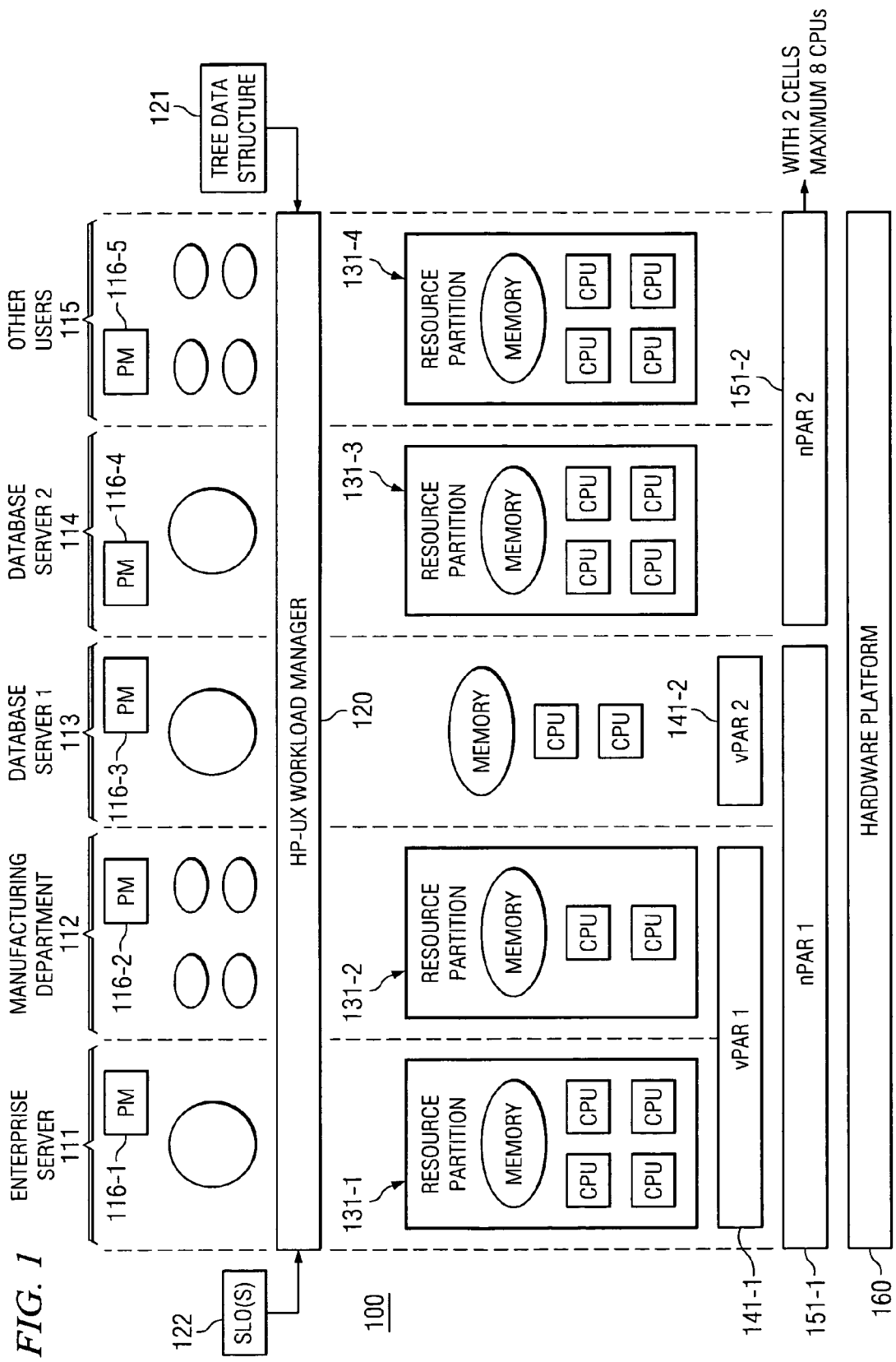
FIG. 1 depicts a computer system according to one representative embodiment of the present invention.

Referring now to the drawings, FIG. 1 depicts computer system 100 according to one representative embodiment. Computer system 100 includes server platform 160 that provides the physical resources for the execution of software processes. These physical resources are assigned to partitions. Specifically, the hardware platform 160 is divided into two physical partitions (nPars 151-1 and 151-2) in the illustrated example. Within nPar 151-1, two virtual partitions are provided (vPars 141-1 and 141-2). Within vPar 141-1, two resource partitions 131-1 and 131-2 are provided. Within nPar 151-2, two resource partitions 131-3 and 131-4 are provided. Of course, a different number of physical, virtual, and resource partitions may be employed in other implementations. System 100 is merely an illustrative example of one possible arrangement of these different types of partitions. Many other arrangements of these and/or other types of partitions may be employed in other systems, and any such arrangements are within the scope of the present application (i.e., the concepts described herein may be employed for any such arrangements).

vPar 141-2 and resource partitions 131-1 through 131-4 represent the lowest levels of partitions in exemplary system 100. Physical resources are allocated (or assigned) to each of the levels to support application software. The application software in this example includes enterprise server software 111, manufacturing department software 112, database server software 113, database server software 114, and other user software 115. Each of these exemplary application software 111-115 is shown in FIG. 1 immediately above the respective partition used to execute the software. Of course, other software may be included in other implementations.

Computer system 100 further includes workload manager software module 120 and performance monitor (PM) software modules 116-1 through 116-5 to facilitate the autonomous and dynamic allocation of system resources in response to workload demands. Specifically, each PM software module 116 monitors the performance of the software within the respective partition. In some embodiments, PM software module 116 monitors the utilization rate of CPUs assigned or allocated to the partitions. If the utilization rate exceeds a threshold value, it may be inferred that the performance of the application software has been adversely affected. Alternatively, PM software module 116 may examine the length of time for one or several applications to perform selected transactions. The length of time to respond to certain database queries could be monitored, as an example. PM software module 116 uses the performance information to determine whether sufficient resources are available to support the desired level of performance. PM software module 116 similarly uses the performance information to identify when the respective partition possesses excess resources given the workload demand of the software applications.

Depending upon the observed workload demand of the software applications, each PM software module 116 may communicate to workload management (WLM) software module 120 information regarding the processing capacity of its respective partition (e.g., whether processing capacity is exceeded and thus more is needed, or whether excess capacity is available). For instance, PM software modules 116 may communicate information requesting additional processing capacity to WLM software module 120. Likewise, each PM software module 116 may communicate information indicating that processing capacity may be deallocated from a respective partition when excess resources are identified.

WLM software module 120 arbitrates between the requests for additional resources associated with the various partitions. Thus, WLM software module 120 is an example of an "arbiter software module." The arbitration is based upon service level objectives (SLOs) 122. SLOs 122 may be implemented to define the relative priorities of the various workloads of the partitions. Additionally, SLOs 122 may be encoded in multiple tiers. WLM software module 120 may select the processor distribution between partitions that satisfies the highest tier defined in SLOs 122. WLM software module 120 then reassigns processors and/or other resources according to the distribution defined by the highest obtainable tier of the SLOs 122. Additional information regarding managing workloads according to service level objectives, as may be employed in certain embodiments of the present invention, may be found in U.S. patent Ser. No. 09/493,753, entitled "DYNAMIC MANAGEMENT OF COMPUTER WORKLOADS THROUGH SERVICE LEVEL OPTIMIZATION," which is incorporated herein by reference.

Figure 2:
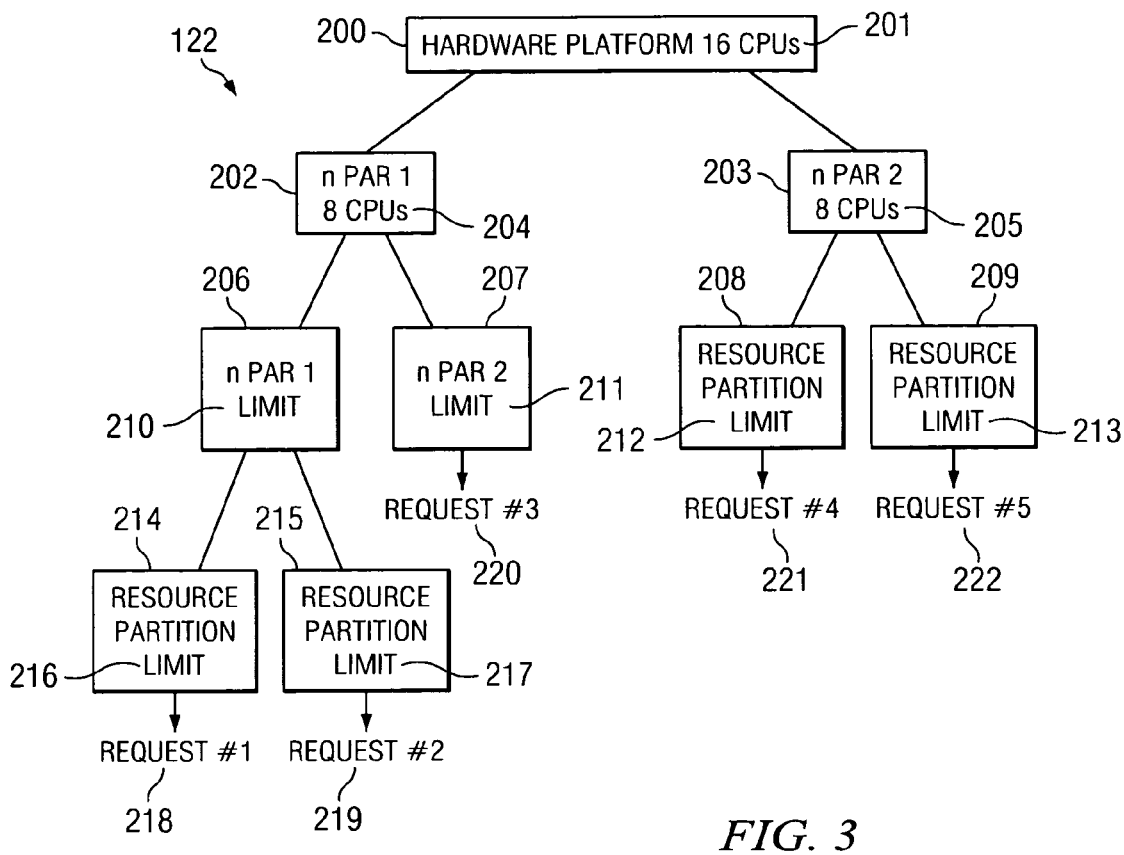
FIG. 2 depicts a data structure according to one representative embodiment of the present invention.

WLM software module 120 efficiently arbitrates between the resource requests and reallocates resources (when appropriate) by using tree data structure 121 which is shown in greater detail in FIG. 2. Tree data structure 122 is information stored to computer-readable media, wherein such information comprises data identifying a plurality of nodes and links between the nodes that corresponds to the multiple tiers of partitions in computer system 100. For example, at the highest level of tree data structure 122, node 200 represents the entire hardware server platform 160 of exemplary system 100 of FIG. 1. From node 200, two tree branches are present (which can be implemented using suitable linking data structures, pointers, etc.). The two branches connect node 200 to nodes 202 and 203 that represent nPars 151-1 and 151-2, respectively. From node 204, there are two tree branches leading to nodes 206 and 207 that correspond to vPars 141-1 and 141-2, respectively. From node 206, there are two branches leading to nodes 214 and 215 that represent resource partitions 131-1 and 131-2, respectively. Referring again to node 203, there are two branches leading to nodes 208 and 209 that represent resource partitions 131-3 and 131-4, respectively.

Tree data structure 122 may be created in a semi-autonomous manner when the partitions on computer system 100 are configured. Specifically, whenever a command is executed to add, delete, or otherwise modify a partition within computer system 100, a corresponding node can be added to, deleted from, or modified within data structure 122. Any administrative variables that are not automatically defined by the executed command can be set to a default value or set to a value obtained from a prompt to the administrator.

The various values can be stored in member variables of the nodes of data structure 122. For example, as shown in FIG. 2, each node of data structure 122 may be implemented to include a "member" variable that identifies the type and instance of partition within computer system 100 represented by the node. Additionally, in each node of data structure 122, a member variable (shown as variables 201, 204, 205, 210, 211, 212, 213, 216, and 217 in FIG. 2) represents the total number of resources assignable to the respective partition. The variable may reflect the physical limit. For example, node 200 includes the total number of CPUs within computer system 100 (16 CPUs). Also, it is only possible to assign 8 CPUs to a given nPar due to hardware constraints associated with the cells used to implement the hardware partitions, wherein such physical limit is reflected by limits 204 and 205 of nodes 202 and 203, respectively. Additionally, other resource limits can be set by an administrator to restrict the amount of resources obtainable by any set of software applications (e.g., for corporate allocation purposes).

Furthermore, resource requests 218-222 are associated with each leaf node (i.e., a node that does not have other nodes underneath it) that indicate the amount of resources requested by the respective PM software modules 116. Other suitable member variables (not shown) can be provided such as a variable to represent the amount of currently allocated resources and the amount of resources to be assigned after a round of resource arbitration.

Figure 3:
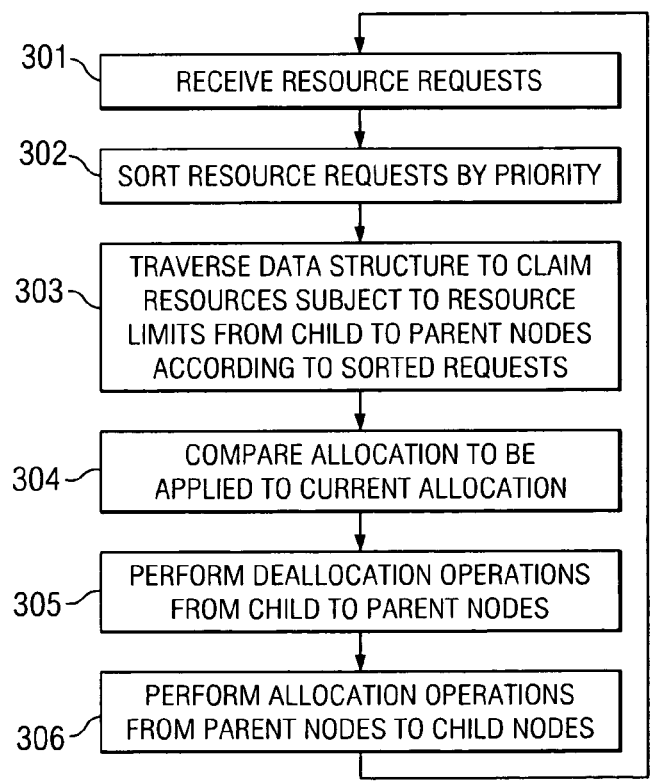
FIG. 3 depicts a flowchart according to one representative embodiment of the present invention.

FIG. 3 depicts a flowchart for using data structure 122 to perform resource allocation with a computer system according to one representative embodiment. In block 301, resource requests are received by WLM software module 120. In block 302, the resource requests are sorted by priority (e.g., as encoded within SLOs 122). In block 303, WLM software module 120 recursively traverses data structure 122 for each request (in priority order) and claims resources for child nodes from parent nodes until resources are exhausted (e.g., as defined by the encoded resource limits) or until a respective request is satisfied. The recursive traversal defines the resource allocation to be applied to the computer system. The resource allocation to be applied is compared to the current resource allocation (block 304).

One benefit of data structure 122 is that once a difference between the allocation to be applied and the current resource allocation is identified, it is relatively straight-forward to perform the reallocation. Specifically, nodes having a negative difference (e.g., a lesser number of resources are identified in their nodes as compared to currently allocated resources) are used to identify where deallocation operations are to be applied. The deallocation occurs first at the lowest level partitions (as identified by the leaf and child nodes) and proceeds up the tree structure of data structure 122 (block 305). After the deallocation operations are applied, the free resources are then allocated down to child and leaf nodes that exhibit a positive difference between the resources to be allocated and the currently allocated resources (block 306). From block 306, the process flow returns to block 301 to perform another round of resource arbitration.

Some representative embodiments may provide a number of advantages. For example, dynamic resource allocation may occur between arbitrary combinations of partitions. Specifically, an algorithm sequence of deallocation and allocation operations can be applied in a non-conflicting sequence due to the structure nature of data structure 122. Furthermore, the arbitration between partitions of different types may occur in an efficient manner by associating resource requests with nodes of data structure 122.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information. Thus, the exemplary operations described above as being performed by WLM software module 120 may be implemented in a system via computer-executable software code for allocating resources among different types of partitions based, at least in part, on a tiered relationship between the different types of partitions that is defined by data structure 121. The software code may run on any suitable processor-based system, and the architecture of such processor-based system is of no limitation as long as it can support the novel operations described herein.

Herein, a "hierarchy" is an arrangement of nodes in which pairs of nodes are coupled by links. Each link represents a parent-child relationship between a parent node and a child node. A hierarchy has a top or "root" node that has no parent but has children. The hierarchy has leaf nodes, each of which has a parent but no children. The hierarchy can have intermediate nodes, each of which has a parent and one or more children. Each node other than the root node has one or more ancestor nodes including its parent node and possibly a grandparent node (a parent node of the parent node), a great-grandparent node, etc. In general, the nodes can be any type of element that can be arranged hierarchically. The nodes of interest herein correspond (either directly or through representation) to a computer system (root node) and its partitions (leaf and intermediate nodes).

What is claimed is:

1. A system comprising:
   a plurality of partitions that provide isolated operating environments for execution of software processes, wherein said plurality of partitions are arranged in a tiered manner with different partition types at different tiers, said types including at least two types selected from a set consisting of:
   hardware partitions, said hardware partitions being physically defined containers for providing electrically isolated environments for executing respective operating systems in a computer system
   virtual partitions, said virtual partitions being logically defined containers configured to provide functionally isolated environments for executing respective operating systems in a computer system, hardware partition, or other virtual partition, and
   resource partitions, said resource partitions being logically defined and functionally isolated containers configured to provide isolated environments for executing respective applications within an operating system environment;
   hardware resources allocable to said partitions;
   a data structure for representing a hierarchical arrangement of said partitions, wherein said data structure comprises multiple nodes, each of said nodes corresponding to a respective one of said partitions and links between said nodes representing parent-child relationships between pairs of said partitions; and
   an arbiter software module for allocating said hardware resources among partitions of at least two of said types, wherein said arbiter software module receives requests to allocate hardware resources to said plurality of partitions and traverses said data structure to determine which requests to satisfy.

2. The system of claim 1 wherein each node of said data structure identifies a type of partition.

3. The system of claim 2 wherein said arbiter software module traverses said data structure and successively performs deallocation operations and allocation operations according to partition types identified in said data structure.

4. The system of claim 1 wherein each node of said data structure identifies a total number of resources that can be allocated to its respective partition.

5. The system of claim 4 wherein said arbiter software module (i) sorts resource requests at leaf nodes of said data structure according to respective priorities assigned to said leaf nodes and (ii) reassigns resources along each branch of said data structure according to said priorities until all resource requests are satisfied or until a total number of resources have been assigned for a respective branch.

6. The system of claim 1 wherein said resources include processor resources.

7. The system of claim 1 wherein said partitions include hardware partitions that provide electrical isolation from each other.

8. The system of claim 1 wherein said partitions include plural virtual partitions running on the same hardware partitions, said virtual partitions using software functionality to provide separate operating system environments.

9. The system of claim 1 wherein said partitions include plural resource partitions that are implemented by time sharing at least a subset of processors of said system.

10. A method comprising:
    representing, in a computer-readable data structure that is stored to non-transitory computer-readable storage media, a hierarchical arrangement of nodes corresponding to respective partitions, each of said partitions providing isolated operating environments for execution of software processes in a system, wherein said partitions comprise partitions of different types, said types including at least two types selected from a set consisting of:
    hardware partitions, said hardware partitions being physically defined containers for providing electrically isolated environments for executing respective operating systems in a computer system
    virtual partitions, said virtual partitions being logically defined containers configured to provide functionally isolated environments for executing respective operating systems in a computer system, hardware partition, or other virtual partition, and
    resource partitions, said resource partitions being logically defined and functionally isolated containers configured to provide isolated environments for executing respective applications within an operating system environment; hardware partitions, virtual partitions, and resource partitions; and
    using, by an arbiter, said data structure for allocating hardware resources among partitions of at least two of said types.

11. The method of claim 10 wherein said using comprises:
    receiving, by said arbiter, requests to allocate resources to said plurality of partitions; and
    traversing, by said arbiter, said data structure to determine which requests to satisfy.

12. The method of claim 10 wherein said arbiter is defined at least in part by computer-executable software code stored to computer-readable media, wherein said computer-executable software code is executable for performing said using.

13. The method of claim 10 wherein said representing comprises including in said data structure multiple nodes corresponding to said plurality of partitions and links between said nodes representing said tiered relationship.

14. The method of claim 13 wherein said representing further comprises identifying in each node of said data structure a type of the partition to which the node corresponds.

15. The method of claim 10 wherein said using further comprises:
  traversing said data structure; and
  successively performing deallocation operations and allocation operations according to partition types identified in said data structure.

16. The method of claim 10 wherein said representing further comprises including in said data structure multiple nodes corresponding to said plurality of partitions and links between said nodes representing said tiered relationship, wherein each node of said data structure identifies a total number of resources that can be allocated to its respective partition.

17. The method of claim 16 wherein said using comprises:
  sorting resource requests at leaf nodes of said data structure according to respective priorities assigned to said leaf nodes; and
  reassigning resources along each branch of said data structure according to said priorities until all resource requests are satisfied or until a total number of resources have been assigned for a respective branch.

18. The method of claim 10 wherein said partitions of different types comprise at least one type selected from the group consisting of: hardware partitions that provide electrical isolation, virtual partitions that provide isolation using software functionality, and resource partitions that are implemented by time sharing at least a subset of processors of said system.

19. A computer product comprising non-transitory computer-readable storage media encoded with code, said code including:
  code for accessing a data structure that comprises information defining a hierarchical relationship between a plurality of different types of partitions that provide isolated operating environments for execution of software processes in a system, said types including at least two types selected from a set consisting of:
  hardware partitions, said hardware partitions being physically defined containers for providing electrically isolated environments for executing respective operating systems in a computer system
  virtual partitions, said virtual partitions being logically defined containers configured to provide functionally isolated environments for executing respective operating systems in a computer system, hardware partition, or other virtual partition, and
  resource partitions, said resource partitions being logically defined and functionally isolated containers configured to provide isolated environments for executing respective applications within an operating system environment; and
  code for allocating hardware resources among partitions of at least two of said types based at least in part on said tiered relationship defined by said data structure.

20. The product of claim 19 wherein:
  a hardware partition provides electrical isolation;
  a virtual partition that isolation using software functionality; and
  a resource partition is implemented by time sharing at least a subset of processors of said system.

21. A method comprising:
  creating or updating a data structure so that it represents a hierarchy having leaf nodes, intermediate nodes, and a root node, said leaf nodes and said intermediate nodes representing respective partitions, said root node representing a computer system including said partitions and hardware resources to be allocated among said partitions, said leaf nodes representing partitions of at least two types selected from a set of types consisting of
  hardware partitions, said hardware partitions being physically defined containers for providing electrically isolated environments for executing respective operating systems in a computer system
  virtual partitions, said virtual partitions being logically defined containers configured to provide functionally isolated environments for executing respective operating systems in a computer system, hardware partition, or other virtual partition, and
  resource partitions, said resource partitions being logically defined and functionally isolated containers configured to provide isolated environments for executing respective applications within an operating system environment;
  receiving requests for said hardware resources to be allocated to respective leaf nodes of said hierarchy; and
  serially processing said requests so as to satisfy each request that can be satisfied without violating a constraint associated with the respective leaf node or any of its ancestor nodes.

22. A method as recited in claim 21 wherein said requests are processed in an order determined by service level objectives associated with workloads running on respective ones of said leaf nodes.

23. A method as recited in claim 21 wherein said serial processing involves allocating resources among said nodes of at least two of said types.

24. A method as recited in claim 23 wherein said serial processing involves allocating resources among said nodes of all said types of said set.

* * * * *

UNITED STATES PATENT AND TRADEMARK OFFICE
CERTIFICATE OF CORRECTION

PATENT NO.        : 7,941,804 B1                                              Page 1 of 1
APPLICATION NO.   : 11/263140
DATED             : May 10, 2011
INVENTOR(S)       : Herington et al.

It is certified that error appears in the above-identified patent and that said Letters Patent is hereby corrected as shown below:

In column 8, line 24, in Claim 21, after "consisting of" insert -- : --.

Signed and Sealed this
Sixth Day of December, 2011

David J. Kappos
*Director of the United States Patent and Trademark Office*